Jan. 4, 1955   L. F. REYNOLDS ET AL   2,698,569
AIR CONDITIONING MEANS FOR VEHICLES
Filed Aug. 10, 1951   4 Sheets-Sheet 1
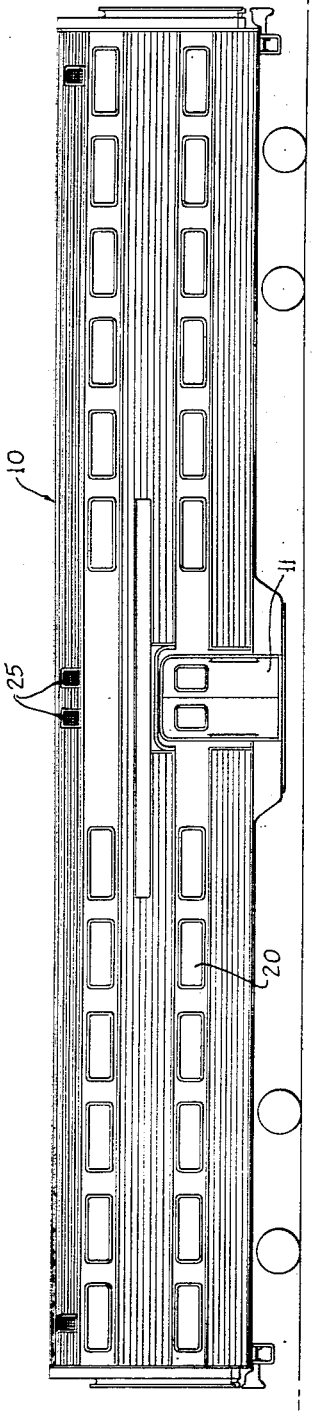
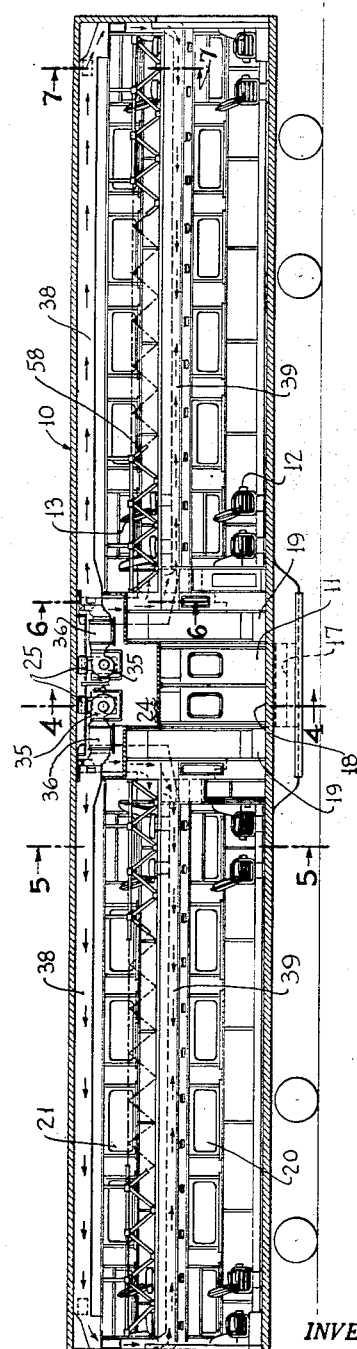
INVENTORS
LEWIS F. REYNOLDS
NORMAN W. FESMIRE
BY Maurice A. Crews
ATTORNEY Jan. 4, 1955 L. F. REYNOLDS ET AL 2,698,569
AIR CONDITIONING MEANS FOR VEHICLES
Filed Aug. 10, 1951 4 Sheets-Sheet 3
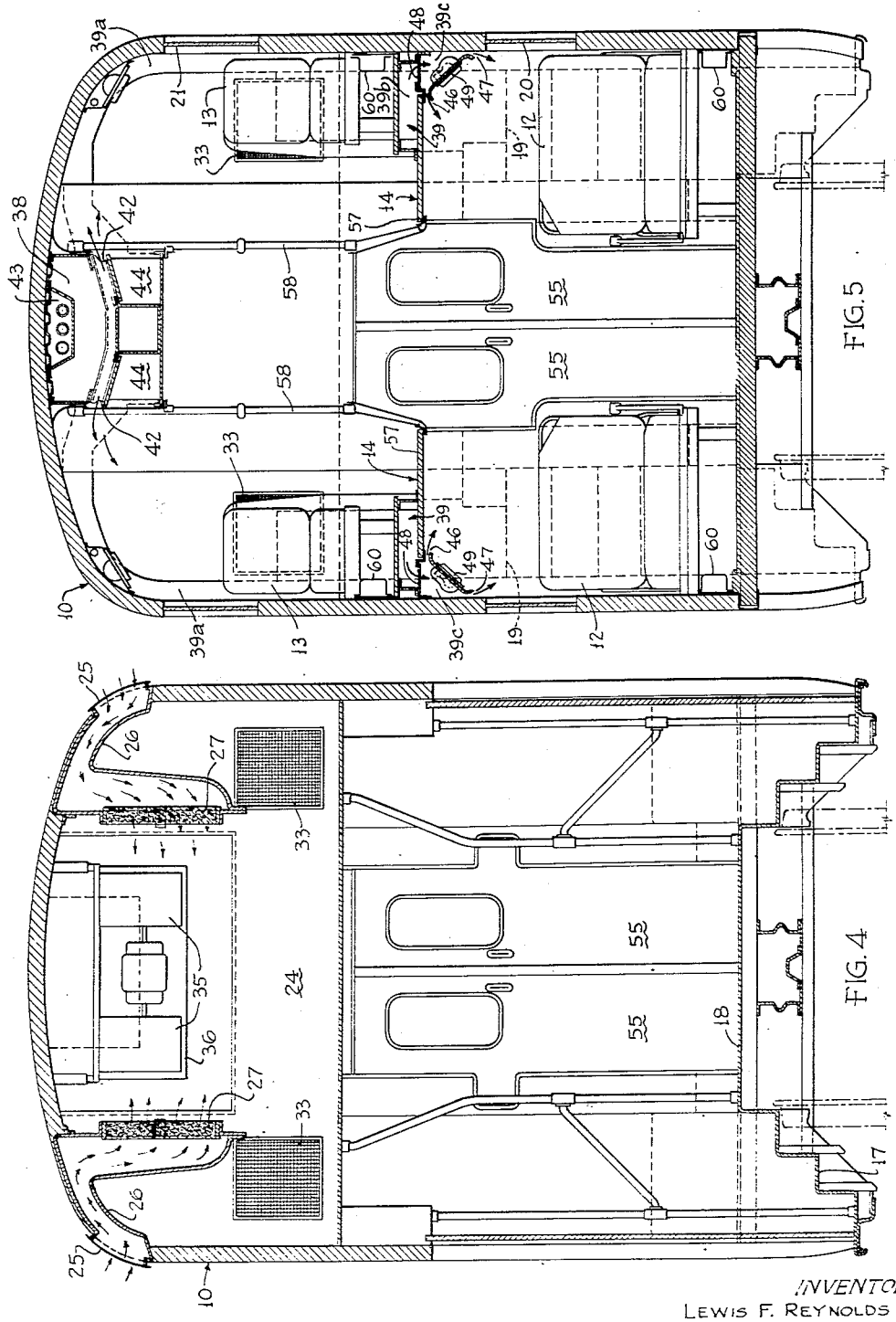
INVENTORS
LEWIS F. REYNOLDS
NORMAN W. FESMIRE
BY Maurice A. Crews
ATTORNEY INVENTORS
LEWIS F. REYNOLDS
NORMAN W. FESMIRE
BY Maurice A. Crews
ATTORNEY United States Patent Office 2,698,569
Patented Jan. 4, 1955

2,698,569

AIR CONDITIONING MEANS FOR VEHICLES

Lewis F. Reynolds, Philadelphia, and Norman W. Fesmire, Willow Grove, Pa., assignors to The Budd Company, Philadelphia, Pa., a corporation of Pennsylvania Application August 10, 1951, Serial No. 241,216

7 Claims. (Cl. 98—10)

This invention relates to air conditioning means for vehicles, especially for double decked vehicles, and has for an object the provision of improvements in this art.

In supplying conditioned air to any enclosure there is considerable difficulty in obtaining an adequate supply of air at points which are located at a great distance laterally from the source of supply or where the conduits have offsets and restrictions. The provision of an adequate lateral flow may require either ducts of large size or blowers of high velocity.

In railway cars, and especially in double decked or gallery cars, the space which is available for air supply ducts is in some places very small. Besides, there is a limit to the permissible velocity of air flow because high velocity air creates objectionable noises and drafts.

It is, therefore, one of the particular objects of the present invention to provide for a vehicle, such as a gallery car, a system of air distribution which will furnish an adequate supply of air to all parts of the car but without requiring unduly large ducts and without objectionably high air velocities.

The objects and advantages of the invention will be apparent from the following description of an illustrative embodiment, reference being made to the accompanying drawings thereof, wherein:

Fig. 1 is a side elevation of a gallery car embodying the present invention;

Fig. 2 is a central vertical longitudinal section;

Fig. 4 is a transverse vertical section taken on the line 4—4 of Fig. 2;

Fig. 5 is a transverse vertical section taken on the line 5—5 of Fig. 2;

Figure 3:
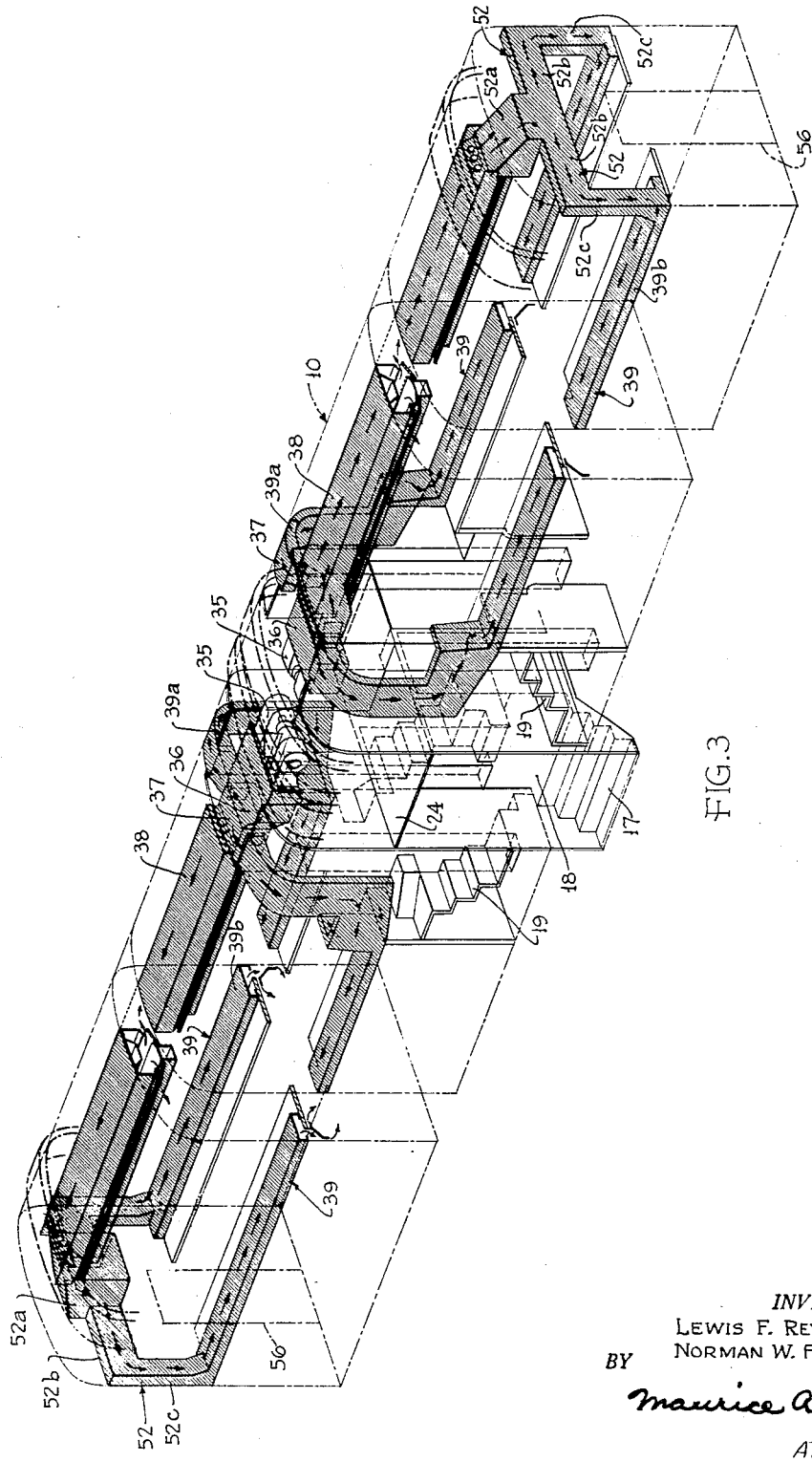
Fig. 3 is an isometric skeletonized view of the car to show the air duct system.

The vehicle in which the present ventilating duct system is installed is a double-decked railway passenger car, generally indicated by the numeral 10, having center doors 11, and being symmetrical about a transverse vertical central plane. There are lower level seats 12 on each side of a center aisle and upper or gallery seats 13 on each of two galleries or balconies 14 which extend inward from each side of the car with an open space between them above the center aisle of the lower level. Stair steps 17 lead from the ground to the lower floor level at a center vestibule 18, and stairs 19 outside the vestibule enclosure at each corner lead respectively to each of the four gallery floors. Windows 20 are provided for the lower floor and windows 21 are provided for the gallery floors.

A plenum chamber 24 is provided above the vestibule space of the lower floor and between the inner ends of the gallery floors. As shown in Figs. 1, 2 and 4, fresh air is admitted from each side of the car to the plenum chamber by way of a roof grill 25, an inside duct 26, and a filter 27. Some of the air escapes from the car by way of inside grills 30, ducts 31 on each side at each end, and outside grills 32; some returns to the plenum space through grills 33 in the end walls of the plenum chamber.

Means are provided for conditioning the air in the plenum chamber, as by heating, cooling, controlling moisture content, removing dust, etc., and for distributing the conditioned air to the passenger spaces within the car. This equipment is the same for each end of the car so a description of that at one end will serve for both.

A motorized blower is indicated by the numeral 35 and the air conditioning equipment is indicated by the numeral 36. The conditioned air passes out by way of a main duct 37 and divides to a ceiling duct 38 and side ducts 39. The side ducts each include a lateral outwardly and downwardly extending portion 39a and a longitudinal horizontal portion 39b extending along the gallery floor beneath the seats. The portion 39a passes above the upper flight and landing of the stairs in a thin wide conduit section 39a1, then spreads in a thin wide conduit section 39a2 along the outer side wall alongside the landing, then passes back inwardly in a thin wide section 39a3 in a back support behind the inner end seat, and then into the portion 39b.

As shown in Fig. 5, air escapes from the ceiling duct 38 through slits 42 on each side to supply the passengers in the gallery seats. A wiring and piping duct 43 is located above the main ceiling duct 38 and package compartments 44 are provided below the ceiling duct. Air passes from the gallery ducts 39b to distributor or spreader ducts 39c located just below the gallery floors and passes from ducts 39c through upper and inner slits 46 and lower and outer slits 47. Air from the outer slits 47 flows down along the window panes to heat them and keep them free from fogging. A perforated plate 48 distributes the air passing from the duct 39b to the lower side ducts 39c. The lower side ducts need not be continuous but may be stopped off at each corner lamp fixture 49.

Inasmuch as the ceiling duct 38 can be made much larger and more direct than the side ducts 39, air can flow much more freely in the ceiling duct than in the side ducts. Advantage is taken of this situation by directing excess air from the ceiling duct back into the outer ends of the side ducts. This transfer is accommodated by end ducts 52 which, as shown in Fig. 7, include the large downwardly extending section 52a, the wide, thin outwardly extending portions 52b, and the wide, thin downwardly extending sections 52c which connect with the outer ends of the side ducts 39b.

As shown in Figs. 4 and 5, paired sliding doors 55 are provided in each end of the center vestibule enclosure to provide passage along the lower center aisle and to give access from the vestibule to the gallery stairs. As shown in Figs. 2, 3 and 7, end doors 56 are provided at each end of the car along the lower floor aisle. The end ducts 52b and 52c clear the top and sides of the end doors.

Figure 7:
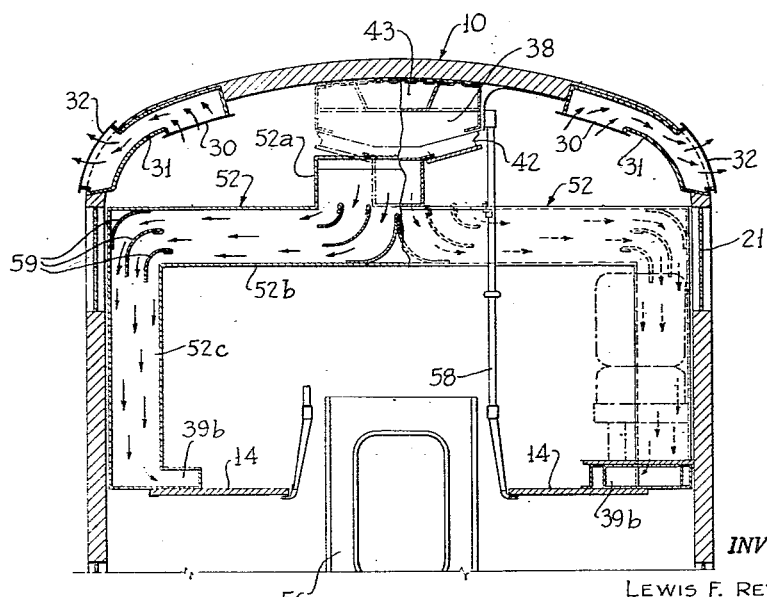
Fig. 7 is a transverse vertical section taken on the line 7—7 of Fig. 2.

It may be noted, especially from Fig. 7, that the horizontal side ducts 39b are formed by structural members which form the strength elements of the gallery floor, the seats being supported on the tops of the side ducts at a raised floor elevation above the level of the gallery side aisle floor 57. The galleries are enclosed on each side of the head space of the lower floor center aisle by partition or railing means 58 which may form a truss for supporting the gallery or may include tension or compression columns for supporting the gallery from the roof or floor.

Figure 6:
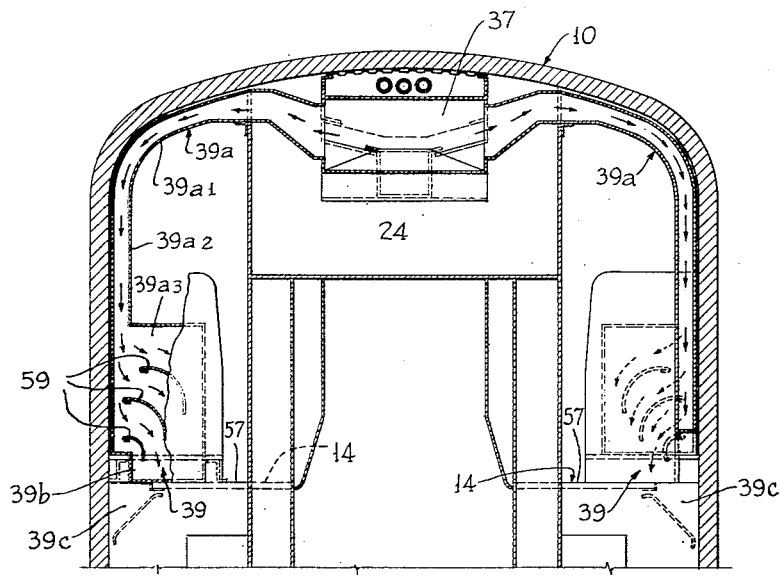
Fig. 6 is a transverse vertical section taken on the line 6—6 of Fig. 2.

It will be noted from Figs. 6 and 7 that curved vanes 59 are provided in the ducts at corners where the air flow changes direction to aid the smooth flow of air at such places. These direction-changing vanes are especially helpful in the present case where wide thin ducts have to be used.

The large ceiling ducts supply most of the air for the car from their side slits and this air not only serves the galleries but in part passes down between galleries to the lower aisle space. As explained, there is enough air supplied through the ceiling ducts to provide part of the air needed in the side ducts. This air being transferred by the end return ducts 52. The side ducts supply air in the outside corners below the gallery floors where, otherwise, zones of stagnant air would exist. This provides air for the outside or window seat passengers on the lower floor and also warms the window panes. This provides comfort at window locations which normally are unduly cold because of chilled pane conditions.

The ventilating air will aid in thermally conditioning the car but other thermal conditioning means may be used, the side wall pipe guards therefor being indicated in Fig. 5 by the numeral 60.

It is thus seen that the invention provides a very efficient distribution of air to all parts of a gallery vehicle by utilizing the available space with economy, leaving as much clear space as possible for passenger use and avoiding all possibility of leaving zones of air stagnation.

While one embodiment of the invention has been illustrated and described to explain the principles of the invention it is to be understood that there may be other embodiments within the scope of the invention.

What is claimed is:

1. An air supply system for a gallery vehicle having upper and lower level passenger accommodations and an entrance serving both levels, comprising in combination, a plenum space above the entrance, air intake and supply means for the plenum space, and separate air distributing means for each half length of the vehicle for furnishing air to the upper and lower passenger accommodations, said air distributing means including upper and lower level ducts both supplied with air from the air supply means and having air distributing outlets along their length, and a connecting duct between the ends of the ducts which are distant from said plenum space for passing excess air from one to the other.

2. An air supply system for a gallery vehicle having a mid-length entrance, lower level passenger accommodations on each side with an aisle between them, and upper level passenger accommodations on each side, comprising in combination, a plenum space above the entrance, air intake and supply means for the plenum space, and separate air distributing means for each half length of the vehicle for furnishing air to the upper and lower passenger accommodations, said air distributing means including an upper level duct and a lower level duct both receiving air from the air supply means at their inner ends and having air distributing outlets along their length, and a duct for supplying air from the outer end of the upper duct to the outer end of the lower duct.

3. An air supply system for a gallery vehicle having lower level passenger accommodations on opposite sides of a center aisle, gallery floors on each side of the car separated in the middle by a space above the center aisle, and passenger accommodations on each gallery floor, comprising in combination, air intake and supply means at a point along the length of the vehicle, a roof ceiling duct leading from said air supply means to the upper portion of the vehicle for the gallery accommodations and center space, side ducts located near each outer side beneath the gallery floor passenger accommodations leading from said air supply means to the space beneath the gallery for the lower level passenger accommodations, said ceiling and side ducts having distributing outlets along their length, and duct means for transferring excess air from the outer end of the ceiling duct to the outer ends of the side ducts.

4. An air supply system for a gallery vehicle having lower floor level passenger accommodations on opposite sides of a center aisle, gallery floor passenger accommodations on each side above the lower floor accommodations separated in the middle by a space above the center aisle, comprising in combination, air supply means at a point along the length of the vehicle, a central roof ceiling duct having distributing slits on each side along its length leading outward from the air supply means, and side ducts beneath the gallery accommodations leading from the air supply means and including distributor portions having upper inner slits for spreading air beneath the galleries and outer lower slits for spreading air downward along the outer side walls.

5. An air supply system for a vehicle having lower floor level passenger accommodations, upper floor level passenger accommodations, and a stairway on each side of the vehicle from the lower floor level to the upper floor level, comprising in combination, air supply means located between the stairways, a main ceiling duct leading from said air supply means, air distributor outlets along the length of said ceiling duct, and side ducts at the upper floor level leading from said air supply means, said side ducts each including a longitudinal section disposed within the structural members forming the support beneath said upper floor accommodations and disposed adjacent the outer side of the vehicle, each side duct having auxiliary distributor duct portions located beneath the upper floor accommodations adjacent the outer side of the vehicle and having openings for supplying air to the lower floor accommodations.

6. An air supply system for a vehicle having lower floor level passenger accommodations and upper floor level passenger accommodations, each on the outer side of a longitudinal center space, and stairways on each side of the vehicle leading from the lower floor level to the upper floor level on the outer side, comprising in combination, air supply means located between the stairways, a central ceiling duct leading from said air supply means, air distributor outlets along the length of said ceiling duct, and side ducts leading from said air supply means over the stairway spaces and along beneath the upper floor level accommodations, said side ducts including lateral wide thin sections extending over the stair spaces, and transverse wide thin sections extending inwardly from the outer sections behind an end of the upper floor level passenger accommodations and connecting with the ends of the duct sections located beneath the upper floor level passenger accommodations.

7. An air supply system for a vehicle having lower floor level passenger accommodations and upper floor level passenger accommodations, each on the outer side of a longitudinal center space, a center door at each end of the center space, and stairways on each side of the vehicle at one end of the center space leading from the lower floor level to the upper floor on the outer side, comprising in combination, air supply means located between the stairways, a central ceiling duct leading from said air supply means, air distributor outlets along the length of said ceiling duct, side ducts on each side beneath the upper floor level accommodations, lateral supply ducts extending from said air supply means to said side ducts at the longitudinally inner ends of the side ducts, said lateral supply ducts including a wide thin section extending over the stairway space, a wide thin section extending down along the outside wall beside the stairway space, and a wide thin transverse section extending inwardly at one side of the stairway space to the inner end of the side duct, and lateral transfer ducts extending from the outer end of the ceiling duct to the outer ends of the side ducts, said transfer ducts including an outwardly and downwardly extending box-like section, a wide thin lateral section on an end wall on each side of and above the end door, and wide thin outer sections along the end wall extending to the outer end of a side duct.

References Cited in the file of this patent

UNITED STATES PATENTS

| | | |
|---|---|---|
| 1,863,949 | Stewart | June 21, 1932 |
| 2,089,799 | Hulse | Aug. 10, 1937 |
| 2,103,990 | Mayer | Dec. 28, 1937 |
| 2,143,827 | Demarest | Jan. 10, 1939 |
| 2,145,222 | Gunter | Jan. 24, 1939 |
| 2,152,129 | Anderson | Mar. 28, 1939 |
| 2,350,514 | Livar | June 6, 1944 |
| 2,405,136 | Dittrich | Aug. 6, 1946 |

FOREIGN PATENTS

| | | |
|---|---|---|
| 391,010 | Great Britain | Apr. 20, 1933 |
| 588,457 | Great Britain | May 22, 1947 |